Dec. 13, 1955  M. A. SLOTTA  2,726,699
ANTISKID CHAIN MOUNTING DEVICES FOR AUTOMOBILE WHEELS
Filed May 3, 1951
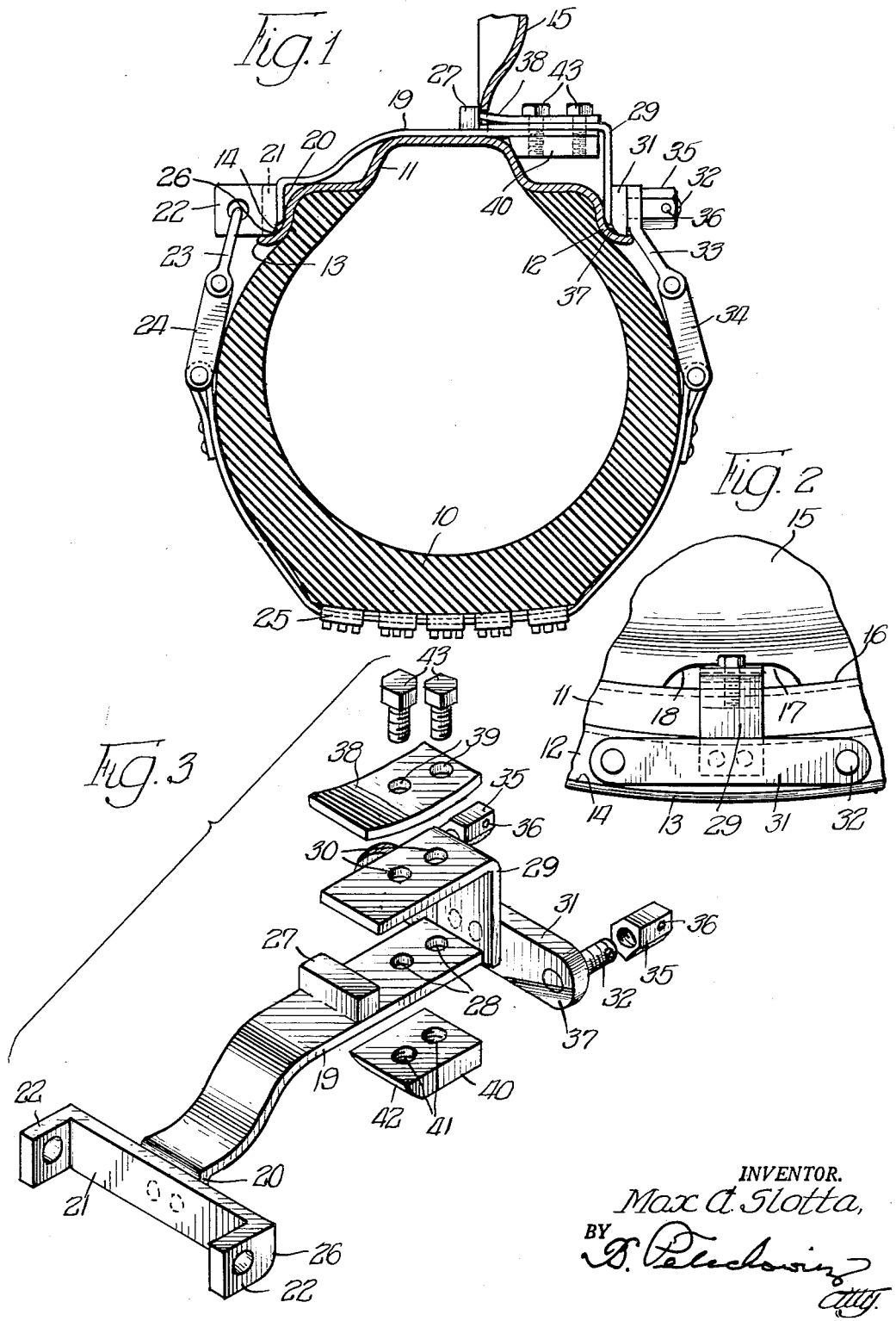
INVENTOR.
Max A. Slotta,
BY United States Patent Office 2,726,699
Patented Dec. 13, 1955

2,726,699

ANTISKID CHAIN MOUNTING DEVICES FOR AUTOMOBILE WHEELS

Max A. Slotta, Antioch, Ill.

Application May 3, 1951, Serial No. 224,398

6 Claims. (Cl. 152—236)

The present invention relates to automobile wheel antiskid devices, and has for its principal object the provision of a suitable anti-skid chain mounting or engaging device.

The conventional automobile disk wheel includes a disk portion and a rim portion of the wheel. The disk portion is usually welded or otherwise rigidly attached to the wheel felly. The disk portion has a plurality of recesses adjacent its margin. Another object of the present invention is the provision of an anti-skid chain mounting device which would fit the felly in a transverse relation therewith, and which may be insertable through the recess aforesaid, and which may be provided with suitable engaging means with the disk portion of the wheel whereby the mounting device once engaged with the wheel would not shift either in a transverse relation with the wheel felly or in a radial direction with relation to the wheel.

Another object of the present invention is the provision of suitable means for engaging an anti-skid chain mounting device with an automobile wheel, particularly with its disk portion so that the device once mounted upon the wheel would be rigidly engaged therewith preventing its shifting in all directions with relation to the wheel.

A still further object of the present invention is the provision in conjunction with a device of the character indicated of a lug to bear against the disk portion of the wheel from one side thereof, with another lug bearing against the felly of the wheel from the direction opposite to that from which the first lug bears, with a resilient yielding member positioned between the felly and the disk, and co-acting with the anti-skid mounting device, for preventing rattling of the latter or shifting thereof into the direction radial with relation to the wheel.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views:

Fig. 1 is a cross sectional view in a transverse relation with the rim portion of the wheel and its tire, showing the anti-skid chain and its mounting device in a side elevation and in an operative position with the wheel;

Fig. 2 is a fragmentary outer face elevational view of the wheel, with the outer end of the anti-skid chain mounting device in elevation; and Fig. 3 is an exploded perspective view of the present device with the parts thereof in a proper position preparatory to the mutual engagement thereof and the engagement with the wheel.

Referring in detail to the present drawing there is shown therein tire 10 mounted upon the rim portion of the wheel. Said rim portion includes felly 11 and rim 12.

Said felly 11 is disposed centrally of the rim portion of the wheel, is much narrower than the said rim portion of the wheel, and presents a frusto-conical appearance on transverse cross section of the rim portion of the wheel, with the narrower end of the felly disposed towards the hub. The rim of the wheel includes an outwardly turned lip 13, on each side of the wheel, which lip 13, in conjunction with the remaining body portion of the rim on each side of the wheel defines a circumferential groove 14 which is arcuate on transverse cross section, all is as clearly shown in Fig. 1.

Co-acting with the rim portion of the wheel is the disk 15, which at its center is engaged by the axle (not shown) of a vehicle. The outer peripheral margin portion of the disk is welded, or otherwise rigidly attached, as at 16 to felly 11 and adjacent the outer face of the wheel. Said disk 15 along its outer marginal portion is provided with a plurality of uniformly spaced, oblong slots 17, which, in conjunction with felly 11 define recesses 18.

Attachable to the wheel as hereinabove described is the anti-skid chain mounting device constituting the subject matter of this application. The said device includes bar 19, one end of which is angularly bent to define arm 20, to the outer face of which cross-piece 21 is rigidly attached either by rivets or welding. Outwardly directed apertured lugs 22, integrally formed with said cross-piece 21 are engaged by hooks 23, extending from yoke 24, to which anti-skid chain 25 by its one end is attached.

The lower corners of said cross-piece 21 are filed as at 26 in order that the same may fit within groove 14 of rim 12, as is seen in Fig. 1, when the device is in an operative position with an automobile wheel.

The portion of said bar 19 farthest removed from arm 20 is in a raised position with relation to arm 20 in order that said farthest removed portion of bar 19 may straddle and contact felly 11.

Integrally formed with said bar 19 or welded thereto is lug 27, which is positioned intermediately of its ends, and which projects from the face of said bar opposite to that from which arm 20 projects. The position of said lug 27 with relation to bar 19 is predetermined so that when arm 20 and cross-piece 21 remain within groove 14, said lug contacts with and bears against the inner face of disk 15 adjacent slot 17. The free end of said bar 19 is provided with a pair of apertures 28 for the purpose hereinafter stated.

Co-acting with said apertured end of bar 19 is L-shaped member 29, one portion of which is apertured as at 30. Said latter portion in the operative condition of said L-shaped member 29 overlies and contacts the outer face of said bar 19, apertures 28 and 30 coming in a mutual alinement.

The other portion of said L-shaped member 29, disposed substantially at a right angle with relation to bar 19, extends within the groove defined by the outer rim 12 of the rim portion of the wheel. There said member 29 has cross-piece 31 rigidly attached thereto either by riveting or welding. The ends of said cross-piece 31 carry threaded bolts 32 with which eye-members 33 are engaged. The opposite ends of said eye-members 33 are pivoted and connected with yoke 34 with which the opposite end of anti-skid chain 25 connects.

In a threaded engagement with the outer end of each bolt 32 is nut 35, which clamps each eye-member 33 against cross-piece 31. Said nut 35 and bolt 32 are apertured as at 36 for receiving a cotter pin for interlocking nuts 35 with their respective bolts 32.

The lowermost corners of said cross-piece 31 are filed as at 37 so that the same may snugly fit within groove 14 defined by the outer rim of the rim portion of the wheel.

Contacting the outer face of the horizontal portion of L-shaped member 29 is concaved plate 38, provided with a pair of apertures 39.

Lug 40, provided with a pair of apertures 41, in the operative assembly of all of the parts in the device, contacts the underface of bar 19. One end of said lug 40 is bevelled, as at 42, for the purpose of contacting with tapering adjacent wall of felly 11. Said apertures 41 are threaded, in order to receive in a threaded engagement with said lug 40 a pair of screw bolts 43. The latter complete the parts of the device.

It is noted that apertures 28, 30, 39 and 41 are in alinement in order that said screw bolts 43 may pass therethrough. When said screw bolts are tightened, bar 19, the horizontal portion of L-shaped member 29 and plate 38 remain in a mutual clamped relation between lug 40 and the heads of the screw bolts 43.

It is observed that when the clamping action upon said concave plate 38 is exerted by the action of screw bolts 43, the opposite end of said plate 38 is caused to exert a strong contactual pressure against the edge of disk 15 at the body portion thereof adjacent said slot 17, it being noted that both the said horizontal portion of L-shaped member 29 and the free end of said plate 38 extending within the recess 18, and contact with lug 27, when the parts of the device are in a mutual operative position with an automobile wheel and the anti-skid chain.

In the operative position of the device with the wheel all the parts are held rigidly in a mutual relation and with relation to the wheel itself. Lug 27 contacting with and bearing against the inner face of disk 15 prevents bar 19 to slide in the direction of said disk 15. Lug 40, bearing against the adjacent, outer face of felly 11 prevents the device to shift into the opposite direction. Due to the action of plate 38, recess 18 is completely filled out with bar 19, the horizontal portion of L-shaped member 29 and of course said plate 38. Said plate 38 frictionally bearing against the adjacent edge of disk 15 along slot 17, prevents the device to shift in a radial relation with the wheel, and at the same time prevents rattling.

It is further observed that when chain 25 is engaged with the present mounting device, the entire load engendered by the chain upon the mounting device is actually carried by the rim of the wheel in view of the fact that the two cross-pieces 21 and 31 remain within the groove or channel 14 defined by the rim and the lip portion 13 thereof. Since cross-pieces 21 and 31 are oblong and are in the nature of chords relative to the rim portion of the wheel, with the filed corners 26 and 37 of said cross-pieces resting within grooves 14 and upon lips 13, said cross-pieces 21 and 31 are thereby prevented from shifting longitudinally of the rim portion of the wheel, by virtue of which arrangement shifting of chain 25 in a longitudinal direction relative to tire 10 is also prevented.

If preferable, lugs 22 may be substituted by threaded bolts, such as bolts 32 to be engaged by fasteners corresponding to eye-member 33, instead of hooks 23.

While there is described herein a preferred embodiment of the present invention, it is nevertheless to be understood that minor changes may be made therein without departing from the spirit and scope of the invention as claimed.

What I claim as new is:

1. An anti-skid chain mounting device for attachment with an automobile wheel having a disk and a felly secured thereto, said disk having a recess adjacent the felly, comprising a chain engaging member, another chain engaging member, both of said members being in a superimposed mutual relation when passed through said recess, means upon one of said chain engaging members for engaging said disk from one side thereof, and means upon said second named chain engaging member for engaging a side of the felly, said last named means being positioned on the side of said disk opposite from that at which said first named means engages said disk.

2. An anti-skid chain mounting device for attachment with an automobile wheel having a disk and a felly secured thereto, said disk having a recess adjacent the felly, comprising a chain engaging member, a second chain engaging member, both of said members being in a superimposed mutual relation when passed through said recess, means upon said first named chain engaging member for engaging said disk from one side thereof, means upon said second named chain engaging member for engaging a side of the felly, said last named means being positioned on the side of said disk opposite from that at which said first named means engages the felly, and expansible means carried by said second named chain engaging member, said expansible means being positioned within said recess for preventing shifting of the device radially of the wheel.

3. An anti-skid chain mounting device for attachment with an automobile wheel having a disk and a rim including a felly secured thereto, said disk having a recess adjacent the felly, the rim portion of the wheel including a lip on each side of the wheel, each lip being outwardly turned for defining a circumferential groove, comprising a bar adapted for insertion through said recess in a transverse relation with the wheel, means for rigidly anchoring said bar to the disk and the felly, and a cross-piece on each end of said bar, each said cross-piece being adapted to enter one of said grooves and to bear radially upon said lip and being adapted to engage at both of its ends an anti-skid chain.

4. An anti-skid chain mounting device for attachment with an automobile wheel having a vertical disk and a felly secured thereto, said felly including a vertical wall portion disposed in a substantially parallel relation with the disk, said disk having a recess adjacent the felly, comprising a chain engaging member, said member being insertable through said recess for positioning in a transverse relation with the wheel, means carried by said chain engaging member for bearing against the disk, and means carried by said chain engaging member for bearing against said vertical wall portion of the felly, the two means bearing against the respective parts from opposite directions for interlocking said chain engaging member with the disk and the felly.

5. An anti-skid chain mounting device for attachment with an automobile wheel having a vertical disk and a felly secured thereto, said felly including an inclined wall portion sloping toward one side of said disk, the disk having a recess adjacent the felly, comprising a chain engaging member, said member being insertable through said recess for positioning in a transverse relation with the wheel, a lug carried by said chain engaging member for bearing against the side of the disk opposite from the side toward which the inclined wall portion of the felly slopes, a block fixed to said chain engaging member for bearing against said inclined wall portion of the felly, and an arcuate plate fixed to said chain engaging member for accommodation within said recess so as to bear radially against the wall portion of the disk adjacent said recess for confining said chain engaging member against radial motion with respect to the disk and forcing said block against the inclined wall portion of the felly so as to cause said lug and said block to positively confine said chain engaging member against the transverse motion with respect to the disk and the felly.

6. An anti-skid chain mounting device for attachment with an automobile wheel having a disk and a rim including a felly secured thereto, said disk having a recess adjacent the felly and said rim including an outwardly turned lip defining a circumferential groove on each side of the wheel, comprising a chain engaging bar, said bar being insertable through said recess for positioning in a transverse relation with the wheel, means carried by said chain engaging bar for bearing against a side of the disk, means rigidly affixed to said chain engaging bar for bearing against a side of the felly, the two means being adapted to bear against the respective parts from opposed directions for positively confining said chain engaging bar against the transverse motion with respect to the wheel, means connected to said chain engaging bar and adapted for positioning within said recess so as to bear radially against the wall portion of the disk adjacent said recess for confining said chain engaging bar against the radial motion with respect to the wheel, and a cross-piece at each end of said chain engaging bar, each said cross-piece being adapted to enter one of said grooves and to bear radially upon said lip for confining said chain engaging bar against the circumferential motion relative to the wheel.

References Cited in the file of this patent

UNITED STATES PATENTS

| | | |
|---|---|---|
| 1,456,473 | Summerfield | May 22, 1923 |
| 2,162,186 | Sundem | June 13, 1939 |
| 2,252,429 | Kirton | Aug. 12, 1941 |
| 2,315,060 | Kane | Mar. 30, 1943 |
| 2,417,752 | Hayes | Mar. 18, 1947 |
| 2,434,362 | Landes | Jan. 13, 1948 |
| 2,461,737 | Huffman et al. | Feb. 15, 1949 |

FOREIGN PATENTS

| | | |
|---|---|---|
| 456,397 | Great Britain | Nov. 9, 1936 |